United States Patent
Hu

(10) Patent No.: US 7,218,212 B2
(45) Date of Patent: May 15, 2007

(54) TWO-STEP CONTROL SIGNAL DEVICE WITH A U-TURN SIGNAL

(76) Inventor: Chien-Chuan Hu, 12F-1, No. 165, Sec. 1, Kan Nien Rd., Taipei (TW)

( * ) Notice: Subject to any disclaimer, the term of this patent is extended or adjusted under 35 U.S.C. 154(b) by 225 days.

(21) Appl. No.: 11/106,152

(22) Filed: Apr. 13, 2005

(65) Prior Publication Data

US 2005/0237174 A1     Oct. 27, 2005

(30) Foreign Application Priority Data

Apr. 19, 2004   (TW)   ............... 93110798 A

(51) Int. Cl.
*B60Q 1/22* (2006.01)
*B60Q 1/34* (2006.01)
*B60Q 1/26* (2006.01)

(52) U.S. Cl. .............. 340/465; 340/463; 340/468; 340/475; 340/478; 340/815.45

(58) Field of Classification Search .......... 340/463, 340/465, 468, 475, 478
See application file for complete search history.

(56) References Cited

U.S. PATENT DOCUMENTS

| | | | | |
|---|---|---|---|---|
| 4,387,361 A * | 6/1983 | Reed | ............ | 340/475 |
| 5,281,950 A * | 1/1994 | Le | ............ | 340/475 |
| 5,663,708 A * | 9/1997 | Strawn | ............ | 340/465 |
| 5,680,100 A * | 10/1997 | Millsap | ............ | 340/463 |
| 5,731,755 A * | 3/1998 | Boxer | ............ | 340/465 |
| 6,958,687 B1* | 10/2005 | Smith | ............ | 340/468 |
| 2005/0168347 A1* | 8/2005 | Sanicola | ............ | 340/815.45 |

* cited by examiner

*Primary Examiner*—Daniel Wu
*Assistant Examiner*—Lam Pham
(74) *Attorney, Agent, or Firm*—patenttm.us; James H. Walters

(57) ABSTRACT

A two-step control signal device is mounted on an automobile and has a turn signal, a U-turning signal and a two-step control circuit. The turn signal has base having a recess and a turn light. The turn light is mounted in the recess. The U-turn signal is mounted on the base and has a circuit board and multiple U-turn lights. The circuit board is mounted on the base and is connected electrically to the turn light. The U-turn lights are mounted electrically on the circuit board around the recess. The two-step control circuit is connected electrically to the turn signal and the U-turn signal, operates the turn signal when in a turn step and operates simultaneously the turn signal and the U-turn signal when in a U-turn step. The operating U-turn signal warns other automobiles nearby that the automobile is making a U-turn.

14 Claims, 6 Drawing Sheets

TWO-STEP CONTROL SIGNAL DEVICE WITH A U-TURN SIGNAL

BACKGROUND OF THE INVENTION

1. Field of the Invention

The present invention relates to a turn signal, and more particularly to a two-step control signal device that has a turn signal and a U-turn signal.

2. Description of Related Art

An automobile usually has several signals mounted on the corners of the automobile to alert other drivers nearby that the automobile will turn, back or brake soon.

With reference to FIG. 7, an automobile has two rear corners and two sets of signals. The sets of signals are mounted respectively on the rear corners and each set of signals has a brake signal (72), a backing up signal (73) and a turn signal (71). The brake signal (72) shines when the automobile brakes. The backing up signal (73) shines when the automobile backs up. However, the turn signal (73) shines regardless whether the automobile is about to make a 90 degree turn or a U-turn. Drivers in other automobiles nearby the automobile cannot immediately distinguish from the shining signal (71) the intended maneuver to be made by the driver in the turning automobile. Thus, a traffic accident may happen because the drivers nearby make an erroneous determination of the shining turn light (71).

To overcome the shortcomings, the present invention provides a two-step control signal device to mitigate or obviate the aforementioned problems.

SUMMARY OF THE INVENTION

The main objective of the invention is to provide a two-step control signal device that has a turn signal and a U-turn signal so the driver can operate the turn signal when making a 90 degree turn and shines simultaneously the turn signal and U-turn signal when making a U-turn.

A two-step control signal device in accordance with the present invention is mounted on an automobile and has a turn signal, a U-turning signal and a two-step control circuit.

The turn signal has a base having a recess and a turn light. The turn light is mounted in the recess. The U-turn signal is mounted on the base and has a circuit board and multiple U-turn lights. The circuit board is mounted on the base and is connected electrically to the turn light. The U-turn lights are mounted electrically on the circuit board around the recess. The two-step control circuit is connected electrically to the turn signal and the U-turn signal, operates the turn signal when in a 90 degree turn step and operates simultaneous the turn signal and the U-turn signal when in a U-turn step.

Other objectives, advantages and novel features of the invention will become more apparent from the following detailed description when taken in conjunction with the accompanying drawings.

DETAILED DESCRIPTION OF PREFERRED EMBODIMENT

Figure 1:
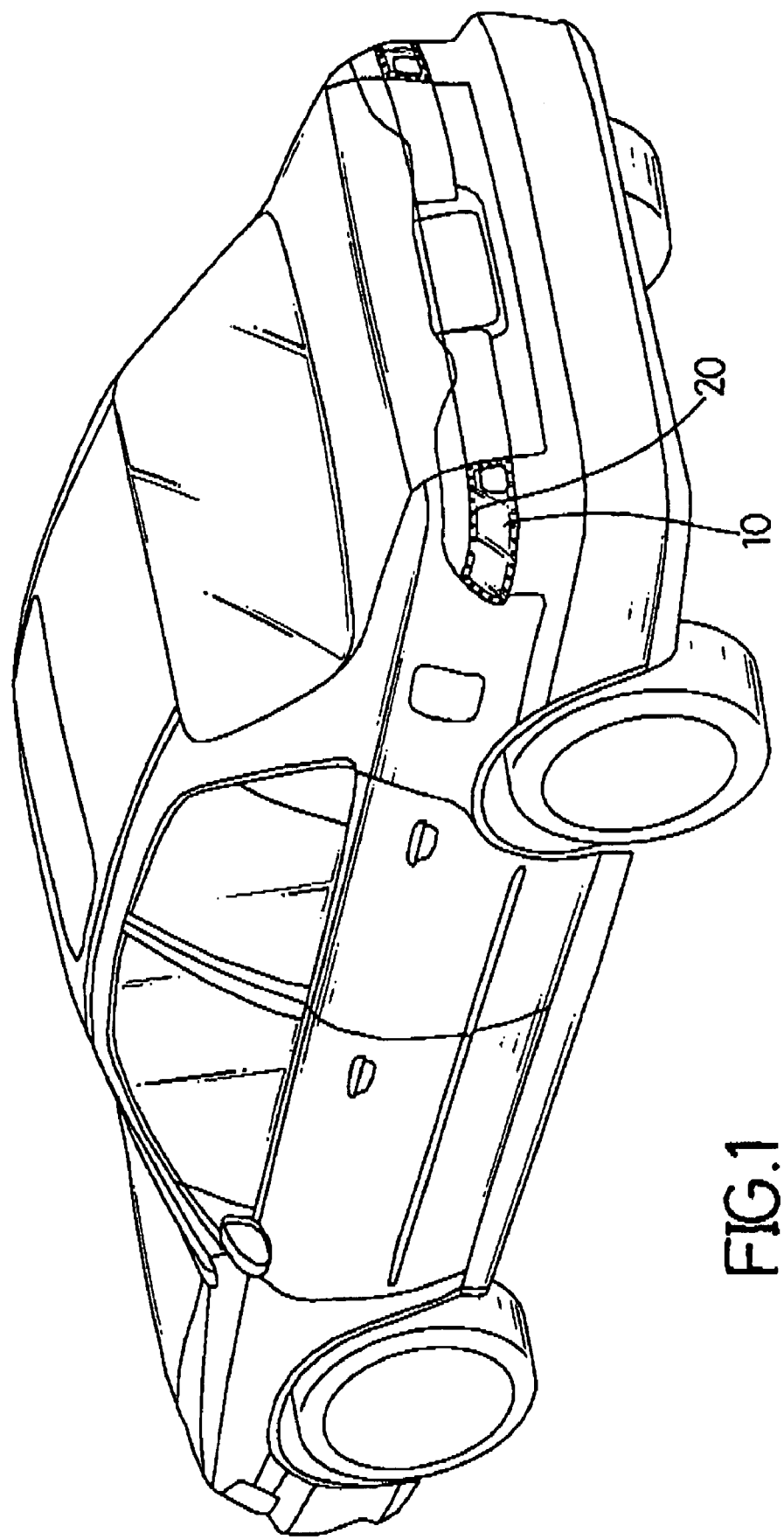
FIG. 1 is a perspective view of an automobile with a first embodiment of a two-step control signal device in accordance with the present invention.
Figure 2:
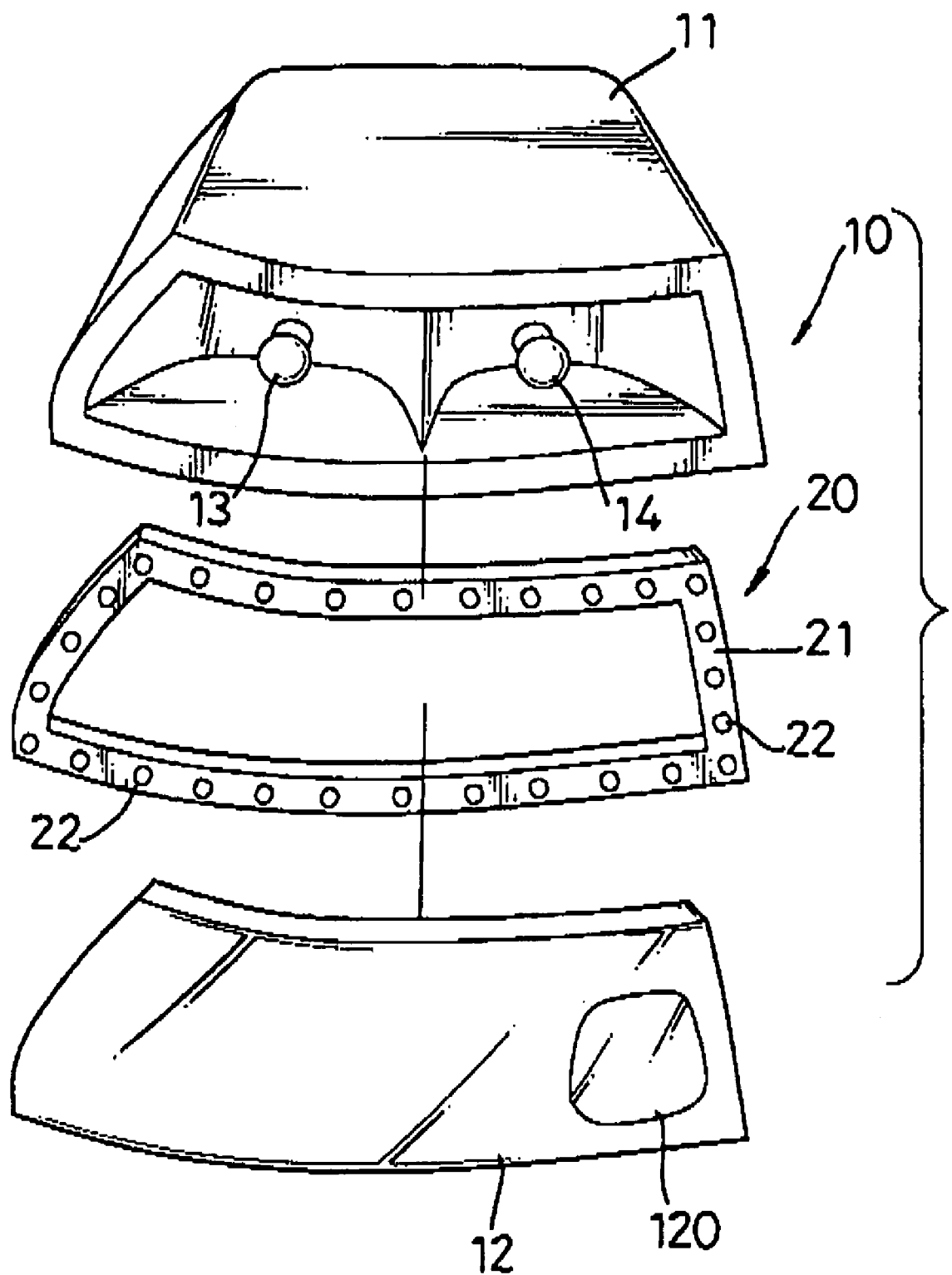
FIG. 2 is an exploded perspective view of the signal device in FIG. 1.
Figure 3:
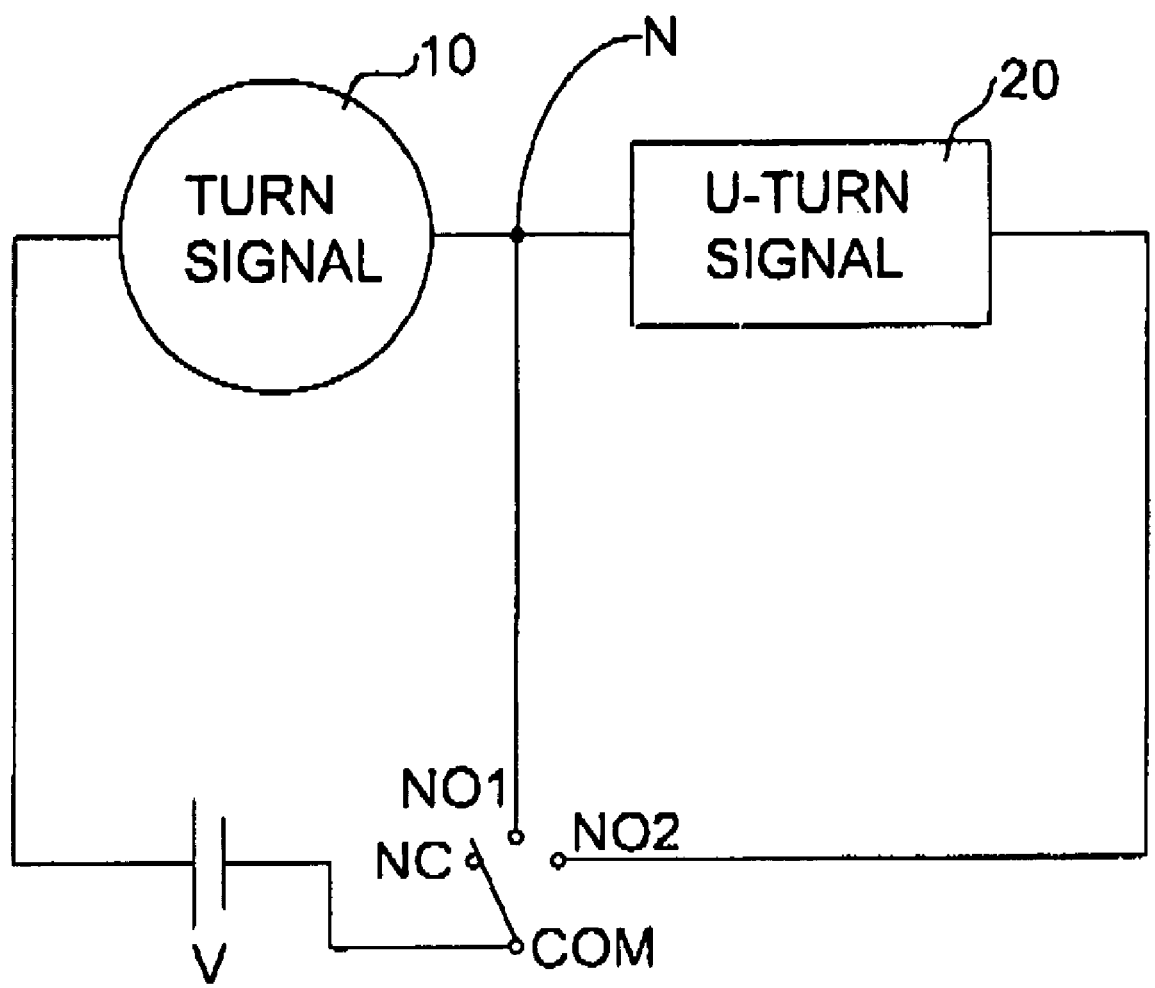
FIG. 3 is a circuit diagram of a signal device in FIG. 2.

With reference to FIGS. 1, 2 and 3, a first embodiment of a two-step control signal device in accordance with the present invention is mounted on an automobile having a rear-left corner, a steering wheel and a control means such as a button or a slide mounted on the steering wheel.

The two-step control signal device is mounted on the rear-left corner of the automobile and has a turn signal (10), a U-turn signal (20) and a two-step control circuit.

The turn signal has a base (11), a turn light (13), an optional brake light (14) and a screen (12). The base (11) has an outside surface and a recess defined in the outside surface and having an inner surface. The turn light (13) is a bulb or light emitting diode and is mounted in the recess. The brake light (14) is a bulb or light emitting diode and is mounted in the recess in the base (10). The screen (12) is transparent, tinted with a first color, is mounted on the inner edge of the recess, and covers the turn light (13) and the brake light (14). The screen (12) has an optional sub screen (120) tinted with a second color and corresponding to the optional brake light (14).

With further reference to FIG. 3, the U-turn signal (20) is mounted on the base (11) and has a circuit board (21) and multiple U-turn lights (22). The circuit board (21) is mounted on the outside surface of the base (11) around the recess and is connected electrically to the turn light (13). The U-turn lights (22) are light emitting diodes and are mounted electrically on the circuit board (21) and are arranged around the recess.

The two-step control circuit is connected electrically to the turn signal (10) and the U-turn signal (20) and is in response to the control means on the steering wheel to operate the turn signal (10) when in a 90 degree turn step and operate simultaneously the turn and U-turn signals (10, 20) when in a U-tarn step.

The two-step control circuit has a power source (V), a node (N), a first normally open terminal (N01), a second normally open terminal (N02), a common terminal (COM), a normally closed terminal (NC) and a switch. The power source (V) is in series connection with the turn signal (10) and the U-turn signal (20) and a sequence of the series connection is the power source (V), the turn signal (10) and the U-turn signal (20). The node (N) is connected electrically to the turn signal (10) and U-turn signal (20) between the turn signal (10) and U-turn signal (20). The first normally open terminal (N01) is connected electrically to the node (N). The second normally open terminal (NO2) is connected electrically to the U-turn signal (20). The common terminal (COM) is connected electrically to the power source (V). The normally closed terminal (NC) is isolated. The switch has a first end and a second end. The first end of the switch is connected electrically to the common terminal (COM). The second end of the switch is selectively connected electrically to one of the first normally open terminal (N01), the second normally open terminal (N02) and the normally closed terminal (NC).

Figure 4:
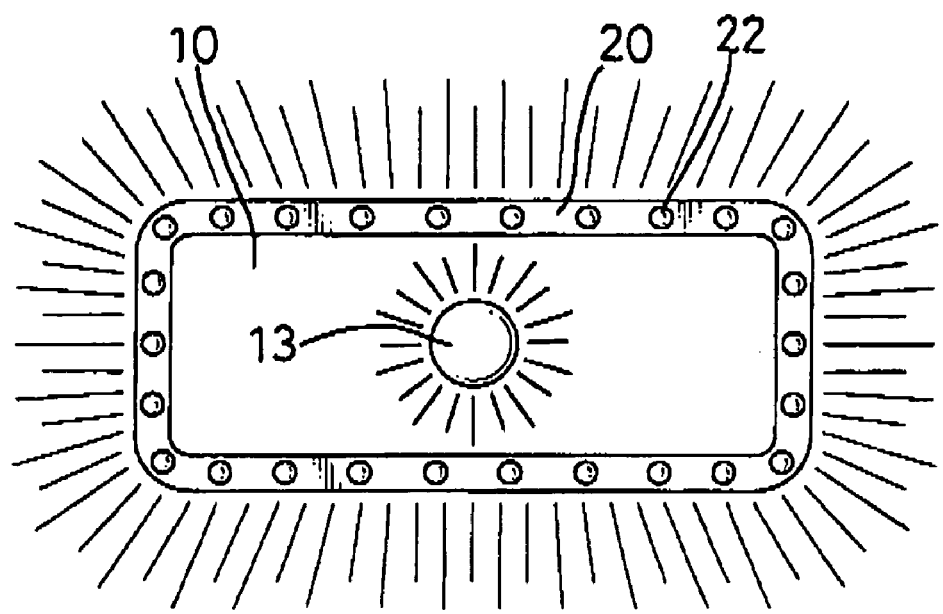
FIG. 4 is an operation plan view of an embodiment of the turning signal device in FIG. 2 with the turn and U-turn lights of the turn signal and the U-turn signal shining intermittently.

With further reference to FIG. 4, the two-step control circuit is interrupted and the turn signal (10) and the U-turn signal (20) is closed when the switch is connected electrically to the normally closed terminal (NC). The two-step control circuit is in the 90 degree turn step and the turn signal (10) operates with the turn light (13) shining intermittently when the switch is connected electrically to the first normally open terminal (N01). The two-step control circuit is in the U-turn step and the turn and U-turn signals (10, 20) simultaneously operate with the turn and U-turn lights (13, 22) shining intermittently when the switch is connected electrically to the second normally open terminal (N02).

Figure 5:
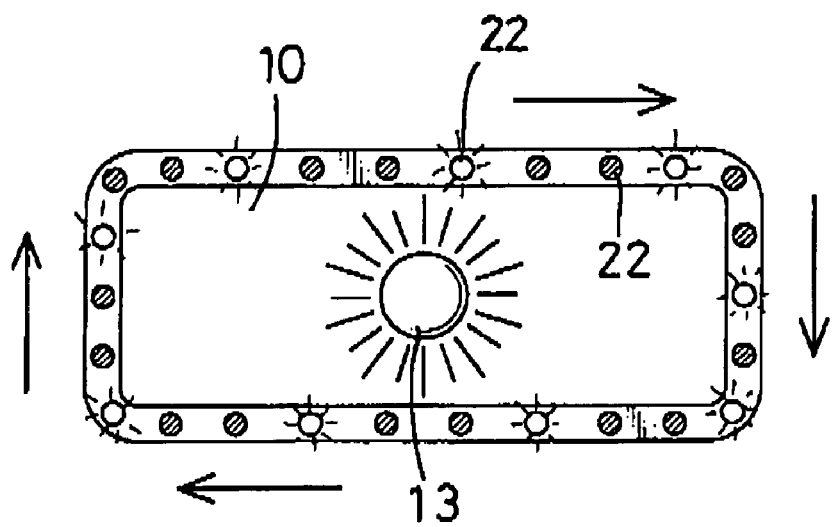
FIG. 5 is an operation plan view of another embodiment of the turning signal device in FIG. 2 with the turn light of the turn signal shining intermittently and the U-turn lights of the U-turn signal shining as a moving looped path.

With reference to FIG. 5, another embodiment of the U-turn signal (20) operates with the U-turn lights (22) shining as a moving looped path when two-step control is in the U-turn step.

Figure 6:
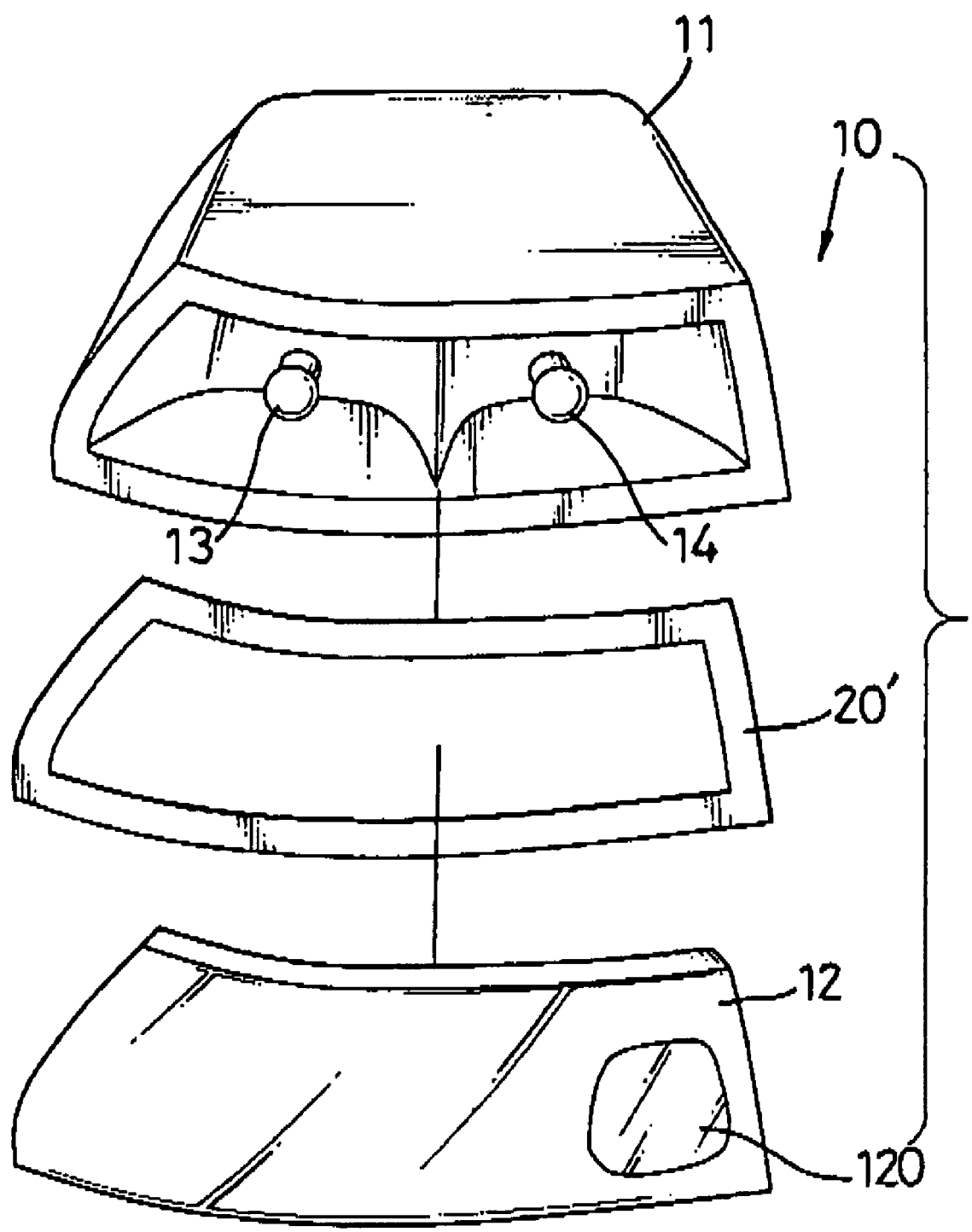
FIG. 6 is an exploded perspective view of a second embodiment of a two-step control signal device in accordance with the present invention.
Figure 7:
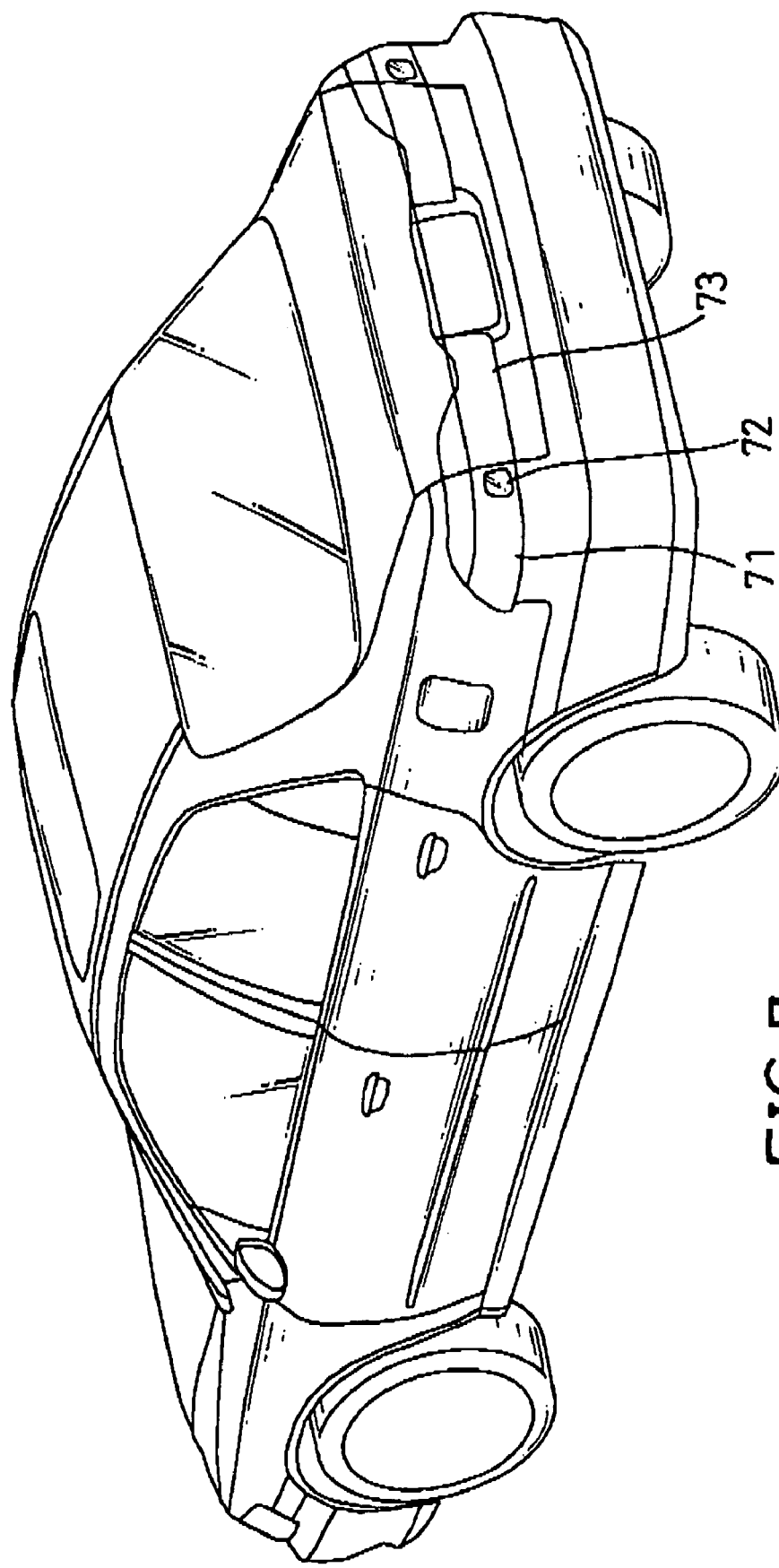
FIG. 7 is a perspective view of an automobile with signal device in accordance with two sets of signals in accordance with the prior art.

With reference to FIG. 6, a second embodiment of a two-step control signal device in accordance with the present invention is similar to the first embodiment and has the U-turn signal (20') being a luminescence board mounted on the outside surface of the base (11) around the recess. The U-turn signal (20') operates with the luminescence board shining intermittently A driver in the automobile operates the turn signal (10) by handling the control means on the steering wheel when making a 90 degree turn and operates the turn and U-turn signals (10, 20) by handling the control means when making a U-turn. Drivers in other automobiles nearby can exactly determine whether a 90 degree turn or a U-turn is to be made by the driver in the turning automobile. Thus, the present invention discloses a significant improvement in road safety devices, whereby confusion is dramatically reduced and death and injury rates from the stated maneuvers will fall.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. A two-step control signal device is mounted on an automobile and comprising:
    a turn signal having
        a base having an outside surface and a recess defined in the outside surface and having an inner surface;
        a turn light mounted in the recess; and
        a screen being transparent, mounted on the inner surface of the recess in the base and covering the turn light;
    a U-turn signal mounted on the base; and
    a two-step control circuit connected electrically to the turn signal and the U-turn signal, operating the turn signal when in a 90 degree turn step and operating simultaneously the turn signal and the U-turn signal when in a U-turn step.

2. The two-step control signal device as claimed in claim 1, wherein the U-turn signal has
    a circuit board mounted on the outside surface of the base around the recess and connected electrically to the turn light; and
    multiple U-turn lights mounted electrically on the circuit board and arranged around the recess.

3. The two-step control signal device as claimed in claim 1, wherein the U-turn signal is a luminescence board mounted on the outside surface of the base around the recess.

4. The two-step control signal device as claimed in claim 1, wherein the two-step control circuit has
    a power source being in series connection with the turn signal and the U-turn signal and a sequence of the series connection is the power source, the turn signal and the U-turn signal;
    a node connected electrically to the turn signal and U-turn signal and located between the turn signal and U-turn signal;
    a first normally open terminal connected electrically to the node;
    a second normally open terminal connected electrically to the U-turn-signal;
    a common terminal connected electrically to the power source;
    a normally closed terminal is isolated; and
    a switch having
        a first end connected electrically to the common terminal; and
        a second end selectively connected electrically to one of the first normally open terminal, the second normally open terminal and the normally closed terminal;
    wherein:
        when the two-step control circuit is in the 90 degree turn step, the second end of the switch is connected electrically to the first normally open terminal; and
        when the two-step control circuit is in the U-turn step, the second end of the switch is connected electrically to the second normally open terminal.

5. The two-step control signal device as claimed in claim 1, wherein the turn signal operates with the turn light shining intermittently.

6. The two-step control signal device as claimed in claim 2, wherein the U-turn signal operates with the U-turn lights shining intermittently.

7. The two-step control signal device as claimed in claim 2, wherein the U-turn signal operates with the U-turn lights shining as a moving looped path.

8. The two-step control signal device as claimed in claim 3, wherein the U-turn signal operates with the luminescence board shining intermittently.

9. The two-step control signal device as claimed in claim 2, wherein the turn light is a bulb and the U-turn lights are light emitting diodes.

10. The two-step control signal device as claimed in claim 2, wherein the turn light is a light emitting diode and the U-turn lights are light emitting diodes.

11. The two-step control signal device as claimed in claim 1, wherein a brake light is mounted in the recess in the base.

12. The two-step control signal device as claimed in claim 11, wherein the screen of the turn signal is tinted with a first color and further has a sub screen tinted with a second color and corresponding to the brake light.

13. The two-step control signal device as claimed in claim 12, wherein the brake light is a bulb.

14. The two-step control signal device as claimed in claim 12, wherein the brake light is a light emitting diode.

* * * * *